United States Patent Office 3,192,077
Patented June 29, 1965

3,192,077
WELDING FLUX
John T. Ballass and Bernard J. Freedman, Groton, Conn., assignors to General Dynamics Corporation, New York, N.Y., a corporation of Delaware
No Drawing. Filed May 23, 1962, Ser. No. 196,875
3 Claims. (Cl. 148—26)

This invention relates to welding flux and, in particular, to a welding flux suitable for use in welding of low alloy high strength steels.

Welding fluxes are indispensable in providing a high quality weldment, their nature and manner of use depending upon the type of metal being joined by the weld and upon the welding process used. Regardless of these variables, the usual purpose of a welding flux is the formation of a protective covering for the metal at the welding site to prevent oxidation and/or other undesirable changes in the metal during welding.

The submerged arc welding process uses a blanket of molten flux to shield the welding electrode and molten deposited metal from the atmosphere. In submerged arc welding of low alloy high strength steels employing the welding wire described and claimed in our co-pending application Serial No. 63,971, filed October 21, 1960, now U.S. Patent No. 3,115,406, for "Low Alloy Steel Welding Wire," and using a commercial neutral flux similar to that disclosed in U.S. Patent No. 2,751,478, and obtainable from Linde Air Products as neutral flux Grade 80, it was found that the strength properties of the weldments were not entirely satisfactory with heat inputs sufficient to provide economic welding speeds.

The present invention relates to a welding flux useful in the welding of low alloy high strength steels which provides deposited weld metal having mechanical properties superior to those achieved by fluxes formerly known and used. While the advantages of the present invention will be illustrated with reference to submerged arc welding techniques, it is recongnized that the fluxes are useful with other welding processes such as Electro-Slag method.

The welding flux of the present invention contains by weight 17 to 40% sodium aluminum fluoride ($Na_3AlF_6$), 5 to 20% aluminum oxide ($Al_2O_3$), 5 to 15% manganese oxide (MnO), and the remainder silicon dioxide ($SiO_2$) and calcium oxide (CaO), the latter two ingredients being present in amounts within the range of proportions by weight of $SiO_2$ to CaO of from about 2:1.

While welding fluxes within the recited ranges of materials have been found satisfactory, the preferred composition contains, by weight, 30% sodium aluminum fluoride, 15% aluminum oxide, 10% manganese oxide, and the remainder silicon dioxide and calcium oxide in the approximate weight ratio of two parts of silicon dioxide to one part of calcium oxide.

The raw materials used in preparing the fluxes of this invention are preferably of the usual commercial purity although incidental impurities do not affect the welding flux appreciably. The raw materials are preferably of a particle size such that 100% thereof will pass through a —50 mesh screen. In preparing the fluxes of this invention, silica, lime, manganous oxide, alumina, and sodium aluminum fluoride are combined in preselected proportions and mixed in the dry state to obtain a uniform homogeneous mixture. The silica may be of a mineral grade containing at least 30% $SiO_2$ and a 5% maximum of aluminum. The lime may be of commercial grade and contain at least 92% CaO after drying at 2000° F. It may also contain a maximum of 1.5% magnesium and 2% aluminum. The manganous oxide may be of a commercial grade containing a minimum Mn content of 45%, a maximum Fe content of 8%, a maximum Al content of 5%, a 1% maximum Zn, As, Pb and 2% maximum of Ba.

The alumina is calcined, of a commercial grade, and contains 99% $Al_2O_3$ after drying at 2000° F. The sodium aluminum fluoride is provided by a technical grade of cryolite.

The welding flux of this invention may be made by any of the conventional methods employed in the art, i.e., either the fusion, the sintering, or the bonding methods.

In the fusion technique, the constituents are mechanically mixed with each other and the mixture placed in a graphite crucible and heated at about 2400 to 2600° F. until it melts. After heating the molten mass for about 20 more minutes to insure complete fusion, it is quenched to room temperature and subsequently ground and crushed. The granules of flux can be stored for an indefinite period of time without the adsorption of moisture.

The flux of this invention may also be prepared according to a sintering technique in which the mechanical mixture of constituents is heated in an oven at 1650° F. for 1½ hours. The mass is then cooled, crushed, screened and used in the same manner as the fused materials.

When the flux of this invention is prepared according to a bonding technique, the mixture of constituents is combined with water glass in a ratio of one part of water glass to three parts of the flux mixture. This mass is then heated to 900° F. for three hours, crushed, screened and then employed in the usual manner. Of the three methods described for preparing the flux of this invention, the fusion technique is preferred.

Table 1 lists a number of specific examples of the inventive welding flux prepared by the fusion method which have provided high strength weldments in low alloy high strength steels at an economically advantageous welding speed. The analysis was determined on the constituent mixture prior to fusion.

TABLE 1

Analysis of flux in percentage by weight

| Flux | $Na_3AlF_6$ | $Al_2O_3$ | MnO | $SiO_2$ | CaO |
|---|---|---|---|---|---|
| A | 5 | 15 | 10 | 47 | 23 |
| B | 10 | 15 | 10 | 43 | 22 |
| C | 15 | 15 | 10 | 40 | 20 |
| D | 20 | 15 | 10 | 37 | 18 |
| E | 30 | 15 | 10 | 30 | 15 |

HY–80 steel, which is an exemplary high strength low alloy steel having a yield strength between 80,000 and 100,000 p.s.i., has the following chemical composition.

Element: Percentage by weight
    Carbon _____ .22 max.
    Manganese _____ .1 to 4.
    Phosphorus _____ .035 max.
    Sulphur _____ .04 max.
    Silicon _____ .15 to .35.
    Nickel _____ 2 to 2.75.
    Chromium _____ .9 to 1.4.
    Molybdenum _____ .23 to .35.

The complete specifications of HY–80 steel may be found in U.S. Government Specification MIL–S–16216D (Navy).

In the experiments of Table 2 designated as fluxes A through E, plates of HY–80 steel were welded using a welding wire 5/32" in diameter in accordance with the above-mentioned co-pending application Serial No. 63,971, the weld metal having the following analysis:

*Weld metal chemical analysis (percent by weight)*

|   | C | S | P | Si | Mn | Mo | Ni | Cr | Cu | Zr |
|---|---|---|---|---|---|---|---|---|---|---|
| A | .09 | .011 | .014 | .84 | 1.07 | .28 | 1.13 | .30 | .40 | .01 |
| B | .10 | .013 | .008 | .72 | 1.11 | .28 | 1.12 | .28 | .39 | .01 |
| C | .10 | .027 | .013 | .73 | 1.21 | .29 | 1.07 | .27 | .42 | .01 |
| D | .12 | .013 | .010 | .66 | 1.16 | .30 | 1.09 | .29 | .42 | .02 |
| E | .07 | .010 | .014 | .64 | 1.28 | .29 | 1.08 | .21 | .42 | .02 |

The mechanical properties of HY–80 steel plates welded with the exemplary welding fluxes set forth in Table 1 and the welding wires described above are listed in Table 2.

TABLE 2

| Welding flux | Plate thickness (in.) | Percent $Na_3AlF_6$ in flux | Arc voltage | Tensile strength (p.s.i.) | Yield strength, .2% offset (p.s.i.) | Percent elongation, based on 4D where D=test bar diameter | Percent reduction in area | Charpy V-Notch impact toughness (impact energy ft.-lbs.) | | | |
|---|---|---|---|---|---|---|---|---|---|---|---|
| | | | | | | | | Room temp. | 0° F. | −60° F. | −80° F. |
| Flux A | 1 | 5 | 27 | 114,500 | 96,500 | 19.4 | 50.3 | 31 | 20 | 15 | 12 |
| Flux B | 1 | 10 | 27 | 114,750 | 89,750 | 18.7 | 50.0 | 53 | 33 | 19 | 15 |
| Flux C | 1 | 15 | 27 | 117,500 | 92,250 | 19.4 | 52.5 | 62 | 44 | 26 | 17 |
| Flux D | 1 | 20 | 27 | 131,900 | 97,500 | 18.6 | 51.1 | 67 | 52 | 34 | 26 |
| Flux E | 1 | 30 | 27 | 114,000 | 84,500 | 21.5 | 57.8 | 76 | 57 | 39 | 33 |

The data shown in Table 2 was obtained from welds made with the above-described 5/32" diameter welding wires and a heat input of about 40,000 joules per inch provided by direct current reverse polarity arc currents of from 550 to 800 amperes with the electrode moving along the weld joint from 16.5 to 22 inches per minute. The welding wire electrodes were bare metal and the granulated flux was supplied to the weld in sufficient quantities by gravity feed concentric with the welding electrode. However, the flux could be coated on the electrodes, if desired.

It is apparent from Table 2 that the inventive welding fluxes containing from 17 to 40% sodium aluminum fluoride and the remaining specified ingredients provide weldments superior to those obtained using conventional prior art fluxes.

From the data, it is evident that the preferred sodium aluminum fluoride range is from 20 to 30% and flux E has provided excellent welds with an economic quantity of 30% sodium aluminum fluoride.

Although the usefulness of the flux of this invention has been described in terms of a submerged welding technique, it is recognized that the flux may be used in other welding methods. For example, the flux of this invention can be used as the flux core of a hollow tubular welding wire. Further, the addition of certain materials to the flux core which form a vapor shield over the welding site is contemplated, such as in the method described in the article by R. A. Wilson in "Welding Journal," vol. 40, No. 1, January 1961. Furthermore, the flux of this invention can be mixed with metallic particles having, for example, the same analysis as the welding wire or as the steel being joined. This type of flux mixture is well known in the art, and because it is attracted to the welding site by magnetism in electric welding, it can be used in situations where a gravity feed of flux cannot be provided.

It will be understood that the above-described embodiments of the invention are illustrative only and modifications thereof will occur to those skilled in the art. Therefore, the invention is not to be limited to the particular examples described herein but is to be defined by the appended claims.

We claim:
1. A welding flux consisting essentially of, by weight from 17 to 40% sodium fluoride, 5 to 20% aluminum oxide, 5 to 15% manganese oxide, and the balance being essentially silicon dioxide and calcium oxide in the approximate weight ratio of silicon dioxide to calcium oxide of 2:1.

2. A welding flux consisting essentially of, by weight, about 30% sodium fluoride, 15% aluminum oxide, 10% manganese oxide, and the balance being essentially silicon dioxide and calcium oxide in the approximate ratio of two parts of silicon dioxide to one part of calcium oxide.

3. A welding flux consisting essentially of metal particles and the flux defined in claim 1.

References Cited by the Examiner

UNITED STATES PATENTS

| 2,435,852 | 2/48 | Stringham et al. | 148—26 |
| 3,023,133 | 2/62 | Lewis et al. | 148—26 |
| 3,023,302 | 2/62 | Kennedy et al. | 148—26 |

DAVID L. RECK, *Primary Examiner.*

WINSTON A. DOUGLAS, *Examiner.*

UNITED STATES PATENT OFFICE
CERTIFICATE OF CORRECTION

Patent No. 3,192,077       June 29, 1965

John T. Ballass et al.

It is hereby certified that error appears in the above numbered patent requiring correction and that the said Letters Patent should read as corrected below.

Column 1, line 65, for "30%" read -- 90% --; column 2, line 59, for ".1 to 4" read -- .1 to .4 --; column 4, lines 33 and 39, after "sodium", each occurrence, insert -- aluminum --.

Signed and sealed this 30th day of November 1965.

(SEAL)
Attest:

ERNEST W. SWIDER
Attesting Officer

EDWARD J. BRENNER
Commissioner of Patents